May 8, 1962     J. L. HARNED ETAL     3,033,305
VEHICLE GUIDANCE SYSTEM
Filed May 19, 1958
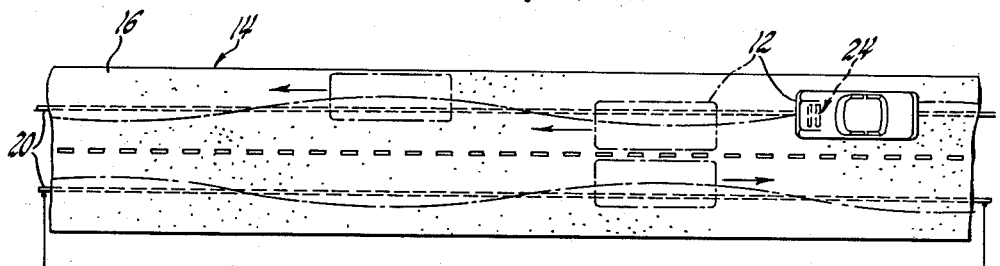
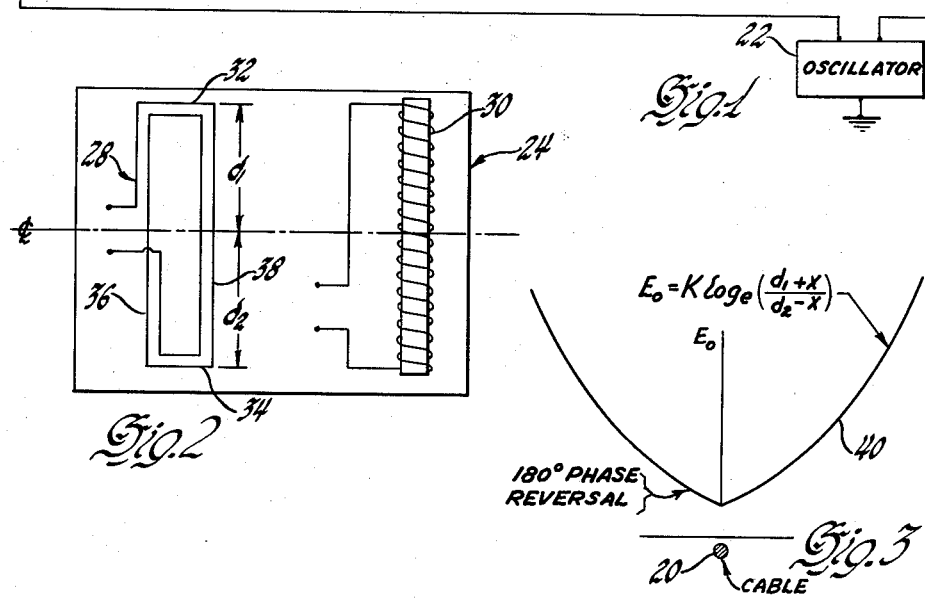
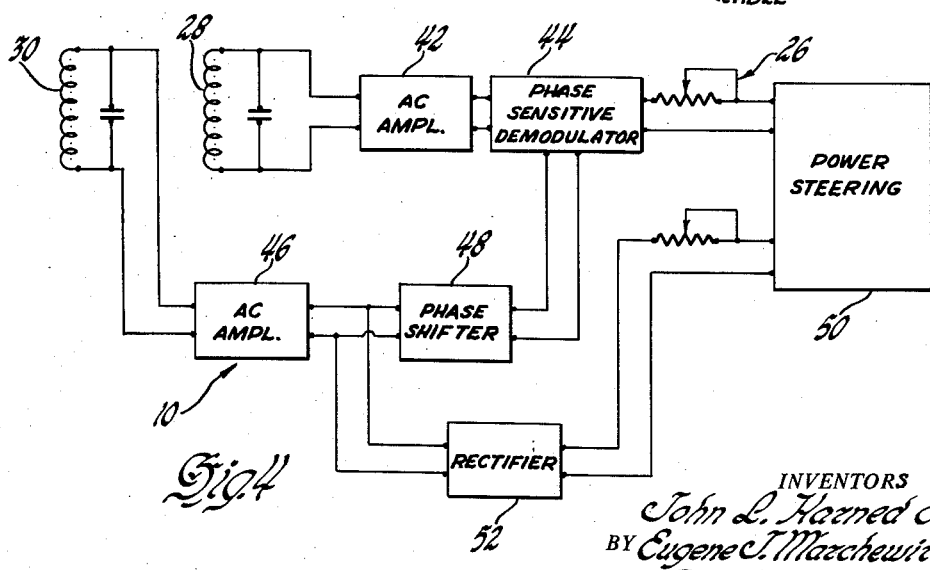
INVENTORS
John L. Harned &
BY Eugene J. Marchewitz
ATTORNEY United States Patent Office 3,033,305
Patented May 8, 1962

3,033,305
VEHICLE GUIDANCE SYSTEM
John L. Harned, Detroit, and Eugene J. Marchewitz, Pontiac, Mich., assignors to General Motors Corporation, Detroit, Mich., a corporation of Delaware
Filed May 19, 1958, Ser. No. 736,081
3 Claims. (Cl. 180—79.1)

The present invention relates to means for controlling a vehicle and, more particularly, to means for automatically guiding or steering an automotive vehicle along a predetermined path such as a highway.

In the past numerous attempts have been made to devise a guidance system which will automatically steer an automotive vehicle along a predetermined path such as one lane of a highway. Heretofore, such systems have been unsatisfactory for numerous reasons. For example, the equipment required for operation of the system has not only been expensive but also has been unreliable in operation. The steering control mechanism has normally required a two channel amplifier which must balance a pair of signals against each other. During continued use, the sensitivity of one channel will decrease faster than the other and thereby produce an unbalanced condition that will cause malfunctioning of the system.

It is now proposed to provide a guidance system which is not only simple and economical to manufacture and install, but is also reliable in operation. More particularly, the system includes a guidance cable buried in the surface of the road and a pickup unit and a control unit that are mounted on the vehicle and effective to guide the vehicle along the cable with the pickup unit normally centered over the cable. The pickup unit includes a detector coil that is disposed in a horizontal plane to produce a null reading when it is perfectly centered over the cable and a reference coil that is wound along an axis transverse to the cable to produce a signal independent of the lateral displacement of the pickup unit. In the event of lateral displacement of the vehicle relative to the cable, an error signal will be induced in the detector coil. The phase of the signal will be a function of the direction of displacement and the amplitude of the signal will be a function of the amount of such displacement. In addition to the detector coil, the pickup unit also includes a reference coil which is positioned adjacent the detector coil. This coil is wound to have a reference signal induced therein which is independent of the lateral displacement of the pickup unit relative to the cable. The phase of the reference signal will always remain constant relative to the current in the cable and the amplitude thereof will be a function of the distance between the pickup unit and the cable. The detector coil is interconnected with a phase sensitive demodulator which is effective to produce a D.C. correction signal, the magnitude of which is responsive to the amplitude of the error signal. The demodulator is also interconnected with the reference coil and will cause the polarity of the correction signal to be a function of the phase relation between the reference signal and error signal, i.e., the direction of displacement of the pickup unit. This D.C. correction signal is, in turn, fed into a power steering servo for directing the vehicle along a path wherein the pickup is centered over the cable.

In the one sheet of drawings:

FIGURE 1 is a plan view of a multi-lane highway and an automotive vehicle traveling therealong, which embody the present invention, whereby the vehicle is automatically guided along the highway.

FIGURE 2 is a plan view of the pickup unit having a detector coil and a reference coil therein.

FIGURE 3 is a graph having a curve thereon illustrating the sensitivity of the pickup unit.

FIGURE 4 is a block diagram of a control system embodying the present invention.

Referring to the drawings in more detail, the present invention is incorporated into a guidance system 10 for steering an automotive vehicle 12 along a highway 14 having a plurality of lanes 16. More particularly, one or more lanes of the highway 14 are equipped with a guidance cable 20 which is preferably embedded below the surface thereof and adjacent the center of the lane 16. This cable 20 is interconnected with an oscillator 22 that will cause an alternating current to flow therein and set up an alternating electromagnetic field thereâround. The frequency of the current and resulting field may be of any desired amount. However, a frequency below the radio broadcasting range and above the audio range will reduce the amount of interference with any radio equipment in the area of the cable.

Any automotive vehicles 12 which are equipped with means for automatically following the cable 20 include a pickup unit 24 and a control unit 26. This pickup unit 24 is preferably suspended from the bottom of the vehicle 12 in reasonably close proximity to the surface of the highway 14. Thus the pickup will travel through any electromagnetic fields radiating from the highway as a result of currents carried in the cable 20. It has been found preferable for the pickup unit 24 to be disposed adjacent the longitudinal center line of the vehicle 12 and near the forward end thereof. It should be understood, however, that under some circumstances, it may be desirable to mount the pickup at other locations; for example, adjacent the center of yaw.

The pickup unit 24 on the vehicle 12 comprises a detector coil 28 and a reference coil 30. The detector coil 28 consists of one or more loops disposed in a horizontal plane parallel to the highway surface. The laterally opposite ends 32 and 34 of the coil 28 are preferably arranged generally parallel to the direction of travel of the vehicle 12 while the fore and aft sides 36 and 38 are normal to the direction of travel. It will be seen that, when this detector coil 28 is symmetrically disposed over the cable 20, the distances $d_1$ and $d_2$ from the ends 32 and 34 to the cable 20 will be equal to each other. Under such circumstances the alternating field about the cable 20 will induce voltages of equal magnitude but opposite phase in the opposite ends 32 and 34 of coil 28. Consequently, the error signal $E_0$ out of the detector coil will be zero. In the event of lateral displacement of the coil 28, $d_1$ will become more or less than $d_2$. This will cause the error signal $E_0$ to appear at the output of the detector coil 28. The magnitude of the signal $E_0$ will be a function of the amount of displacement. More particularly, $$E_0 = k \log_e \left( \frac{d_1 + x}{d_2 - x} \right)$$

This is represented by the curve 40 in FIGURE 3. It should be noted that lateral displacement of the detector coil 28 from one side of the cable to the other side thereof will produce a 180 degrees phase shift in the error signal $E_0$.

The output of the detector coil 28 is interconnected with the input of an amplifier 42 which raises the error signal to a more useful level and, in turn, feeds the amplified signal into the input of a phase sensitive demodulator 44. The reference coil 30 is interconnected with an amplifier 46 which amplifies the reference signal and, in turn, feeds the amplified signal into a phase shifter 48 which is interconnected with a second input into the phase sensitive demodulator 44. The phase shifter 48 is adapted to shift the phase of the reference signal until it corresponds with the phase of the error signal, i.e., phase shifter 48 is adjusted so that the error signal is either in phase with the reference signal or 180° out of phase therewith.

The phase sensitive demodulator 44 is adapted to demodulate the error signal and produce a D.C. correction signal, the magnitude of which is a function of the amplitude of the error signal. The demodulator 44 also compares the phase of the shifted reference signal and the error signal, and the polarity of the D.C. correction signal is a function of whether the reference and error signals are in phase or 180 degrees out of phase. In other words, since the phase of the error signal is a function of the direction of displacement of the detector coil, the polarity of the correction signal is indicative of the direction of deviation.

As a result, the demodulator has a D.C. output the magnitude of which is a function of the amount of deviation and the polarity of which is a function of the direction of deviation.

The output of the demodulator 44 is interconnected with a suitable power steering unit 50 which can be made responsive to an electrical correction signal. For example, the power steering unit 50 may be similar to that disclosed and claimed in the patent to William F. Milliken et al., 2,865,462, issued December 23, 1958, and assigned to the common assignee. This power steering unit 50 is responsive to the correction signal and is effective to turn the vehicle in a direction determined by the polarity of the correction signal and by an amount determined by the magnitude of the signal.

In order to compensate for variations in the strength of the error signal, which may result from variations in the height of the pickup unit 24 relative to the surface of the highway 14, the strength of the current in cable 20, etc., the reference amplifier 46 may be interconnected with a rectifier 52 which rectifies the amplified reference signal and produces a D.C. signal. This signal may also be fed into the power steering unit 50. The strength of this signal will be independent of the lateral displacement of the reference coil 30 but will be a function of the strength of the signal received by the pickup unit 24. Thus by comparing the relative strengths of the rectified reference signal and the demodulated error signal, the amount of correction applied by the power steering unit 50 will be a function of only the amount of lateral displacement of the vehicle 12 and will be substantially independent of the strength of the signal being radiated into pickup unit 24.

It is to be understood that, although the invention has been described with specific reference to a particular embodiment thereof, it is not to be so limited since changes and alterations therein may be made which are within the full intended scope of this invention as defined by the appended claims.

What is claimed is:

1. Means for guiding a moving vehicle along a predetermined path defined by a cable having an alternating current flowing therein, said means comprising a detector coil mounted on said vehicle in juxtaposition to said cable whereby said current induces a voltage therein having an amplitude proportional to the lateral and vertical displacement of said coil from said cable and a phase indicative of the direction of lateral displacement, a reference coil mounted adjacent said detector coil whereby said current induces therein a voltage substantially independent of the lateral displacement of said coils from said cable but related to the vertical displacement thereof, a phase sensitive demodulator interconnected with said detector and reference coils to produce a first output voltage having an amplitude proportional to the voltage induced in said detector coil and a polarity corresponding to the phase relationship between the voltages induced in said coils, rectifier means interconnected with said reference coil to produce a second output voltage having an amplitude corresponding to the voltage induced in said reference coil, and a steering mechanism connected to the wheels of said vehicle and responsive to said first and second output voltages, said steering mechanism adapted to apply a steering correction to said vehicle wheels in a direction determined by the polarity of said first output voltage and in an amount related directly to the magnitude of said first output voltage and inversely to the magnitude of said second output voltage.

2. Means for guiding a moving vehicle along a predetermined path defined by a cable having an alternating current flowing therein, the means comprising a first inductive coil mounted on said vehicle such that the alternating current induces therein a first signal having an amplitude dependent upon the vectorial sum of the vertical and horizontal components of the displacement of the first coil from the cable and a phase dependent upon the direction of lateral displacement, a second inductive coil mounted on the vehicle adjacent the first coil such that the current in the cable induces therein a second signal having an amplitude dependent upon the vertical component of displacement of the second coil from the cable and a phase which is independent of displacement, a phase sensitive demodulator for receiving the first and second signals and for producing therefrom a third signal having an amplitude dependent upon the vectorial sum of the vertical and lateral displacement of the first coil from the cable and a phase dependent upon the phase relation between the first and second signals, signal producing means for receiving the first signal and for producing therefrom a fourth signal whose amplitude is dependent upon the vertical component of displacement of the second coil from the cable and whose phase is substantially constant, a servo mechanism operatively interconnected with the vehicle steering gear and the phase sensitive demodulator and signal producing means to produce a correction in the steering gear effective to maintain the vehicle in a proper disposition with respect to the predetermined path, the servo mechanism including means for comparing the third signal to the fourth signal whereby the difference between the component of vertical displacement of the third signal and the component of vertical displacement of the fourth signal remains a constant independent of the vertical displacement of the vehicle relative to the cable.

3. Means for guiding a moving vehicle with dirigible wheels along a predetermined path defined by a cable having an alternating current flowing therein, the means comprising a first inductive coil mounted on the vehicle so as to be in proximity to the cable when the vehicle is proceeding along the predetermined path, the plane of the first coil being substantially horizontal such that the current induces therein a first voltage having an amplitude dependent upon the sum of the vertical and lateral displacement components of the first coil from the cable and a phase which is dependent upon the direction of lateral displacement, a second inductive coil mounted on the vehicle adjacent the first coil so as to be vertically and laterally movable therewith, the axis of the second coil being substantially horizontal and perpendicular to the cable such that the current induces therein a second voltage having an amplitude dependent upon the vertical displacement of the coil from the cable and having a phase which remains substantially constant independently of displacement, a phase sensitive demodulator having first and second inputs respectively interconnected with the first and second coils, the demodulator being effective to produce a first signal having an amplitude corresponding to the amplitude of the first voltage and having a polarity corresponding to the phase relation of the first and second voltages, a power steering mechanism for controlling the dirigible wheels of the vehicle in response to the signals appearing at the inputs thereto, signal producing means connected to the second coil and adapted to produce a second signal having an amplitude dependent on the amplitude of the second voltage, and means to apply the first and second signals to the power steering mechanism inputs thereby balancing the vertical displacement responsive second voltage against the vertical displacement responsive component of the first voltage such that the sum of the first and second signals is independent of the vertical displacements of the vehicle from the predetermined path.

References Cited in the file of this patent

UNITED STATES PATENTS

| | | |
|---|---|---|
| 2,661,070 | Ferrill | Dec. 1, 1953 |
| 2,742,099 | Hagen | Apr. 17, 1956 |
| 2,835,858 | Moseley | May 20, 1958 |

OTHER REFERENCES

Barrett-Cravens Co., Bulletin No. 552-1, "Guide-O-Matic Operatorless Tractor," May 18, 1955.